June 18, 1957 J. E. T. WELLAND 2,795,878
INDICATING INSTRUMENTS
Filed June 15, 1956

INVENTOR
JOHN EDWIN THOMAS WELLAND
BY
Young, Emery + Thompson
ATTORNEYS

United States Patent Office 2,795,878
Patented June 18, 1957

2,795,878

INDICATING INSTRUMENTS

John E. T. Welland, London, England, assignor of one-half to Geecen Limited, London, England, a British company Application June 15, 1956, Serial No. 591,720

Claims priority, application Great Britain August 16, 1955

8 Claims. (Cl. 40—77)

This invention relates to instruments having indicating means giving required information of a changing nature, for example taximeters, motor instruments and aircraft instruments. The indicating means usually comprise rotating discs or rollers which carry a series of numbers or other information. For example in a taximeter, one part of an apertured panel has apertures for (1) the fare indicated by numbers on fare rollers, (2) extras, (3) means for indicating the position of the flag or other actuating device to show "for hire," "hired" or "stopped," and (4) a lower horizontal row of totalising rollers.

The object of the invention is to provide improved means for ensuring adequate illumination of the indicating means.

Instruments are commonly provided with a front transparent plate (e. g. glass) and with an electric lamp, the light from which is directed downwardly behind the apertured panel, but this does not sufficiently illuminate all parts of the rollers which are visible through the apertures.

According to the present invention the instrument comprises a transparent plate, indicating means, a panel located between said plate and indicating means and having openings therein through which said means can be seen, means for mounting an electric lamp at one edge of the panel so as to direct light on both sides of the panel, said plate and panel both being flat and disposed at a slight angle to each other, whereby said indicating means are illuminated by direct light behind the panel and by light reflected from the transparent plate through the apertures.

The indicating means may be rollers having the indications on their peripheral surfaces. A reflecting surface may be provided at the front of the panel and/or at the rear of the panel on the side of one series of the indicating rollers remote from the lamp for further reflection of light on to the indicating rollers.

The lamp bulbs may be at the top of the meter dial throwing a portion of the light down at the back of the aperture plate and a portion on the front, through the medium of diffusion by glass which can be in colour or plain. This in turn is reflected by the front or back horizontal reflecting surfaces provided by bars or plates fitted to the apertured panel underneath the appropriate apertures. The front glass of the meter or other instrument may be sloped outward, from top to bottom, a certain small number of degrees. Alternatively, the glass may slope inwards from top to bottom. In either case the bulbs may be arranged at the bottom if desired. If desired, the glass may slope from side to side, i. e. outward from right to left or inward from right to left, and with the bulbs at one side or the other.

The invention is illustrated by way of example with reference to the accompanying drawings wherein:

Figure 2 is a sectional view on the line 2—2 on Figure 1; and

Figure 3 is a similar sectional view of a modified construction.

Figure 1:
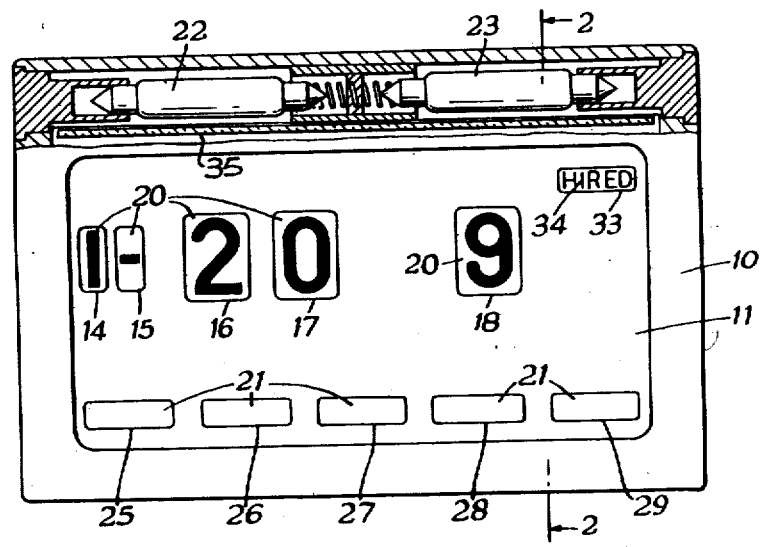
Figure 1 shows a taximeter mainly in front view but with a part shown in section.
Figure 1:
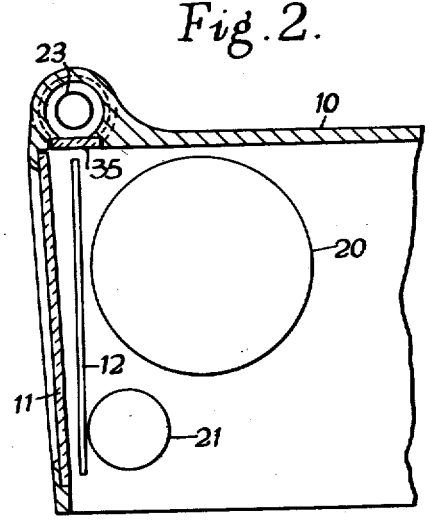
Figure 1:
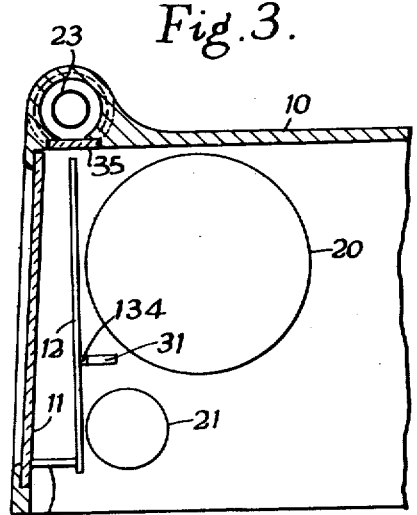

The taximeter casing 10 has an open front wall carrying a front flat transparent glass 11. An apertured panel 12 is vertical and has two series of apertures, viz. one series 14, 15, 16, 17, 18, and another series 25, 26, 27, 28, 29. The instrument has two corresponding series of rollers 20 and 21, the axis of the rollers 20 being parallel to and spaced from the axis of the rollers 21. The rollers are disposed closely behind the respective apertures so that the numbers or other signs on the peripheries of the fare rollers 20 and the totaliser rollers 21 can be seen. An electric light in the form of one or more tubular bulbs 22, 23 is provided horizontally along the top edge of the panel 12 so as to project slightly on both sides thereof. The panel is disposed radially of the lamps. The lower edges of the glass plate 11 and panel (Fig. 2) are nearer together than their upper edges, whereas in Fig. 3 the top edges are nearer together than the bottom edges so that in either case the glass is at an angle of about 30° to 10° to the panel. At the lower part of the panel a bar 30 is fixed horizontally with its upper surface level with the lower edge of the totaliser rollers apertures. This upper surface reflects light on to the totaliser figures. Another bar 31 is fixed at its ends to the back of the panel with its upper surface level with the lower edge of the upper indicator apertures. This upper surface reflects light upwards on to the indicators so that these are illuminated by reflected light from below. A gap 134 between the bar 31 and plate 11 (between the ends of the bar) permits light to pass down below the bar 31. The lower surface may reflect light down on to the rollers 21.

The panel and bars may be white or a light colour and otherwise highly reflective.

The panel 11 also has an opening 33 to show indications "hired," "for hire," or "stopped" which are carried on a disc 34.

A translucent glass panel 35 is mounted between the lamps 22, 23 and the panel 12 to disperse the light evenly.

Any suitable brackets, clips or the like may be provided for mounting the various parts in the positions shown e. g. for fixing the parts 11, 12, 35 to the casing and for connecting the lamps 22, 23 in an electric circuit in known manner.

I claim:

1. An instrument having a transparent plate, indicating means, a panel located between said plate and indicating means, and having openings therein through which said means can be seen, means for mounting an electric lamp at one edge of the panel so as to direct light on both sides of the panel, said plate and panel both being flat and disposed at a slight angle to each other, whereby the said indicating means are illuminated by direct light behind the panel and by light reflected from the transparent plate through the apertures.

2. An instrument as claimed in claim 1 wherein the panel is disposed radially of the lamp.

3. An instrument as claimed in claim 1 wherein the plate is at an angle of 30° to 10° to the panel.

4. An instrument as claimed in claim 1 wherein the indicating means are rollers having the indications on their peripheral surfaces.

5. An instrument as claimed in claim 4 wherein the rollers are arranged in two series, each series having a common axis, said axes being parallel to each other.

6. An instrument as claimed in claim 4 wherein a reflecting bar is provided at the front of the panel on the side of one series of rollers remote from the lamp and across the openings to reflect light through the openings on to the rollers.

7. An instrument as claimed in claim 4 wherein a reflecting bar is provided at the back of the panel on the side of one series of rollers remote from the lamp to reflect light on to the rollers.

8. An instrument as claimed in claim 1 wherein a translucent light diffusion element is provided between the electric lamp mounting means and the panel.

References Cited in the file of this patent
UNITED STATES PATENTS

| | | |
|---|---|---|
| 1,978,402 | Crane et al. | Oct. 30, 1934 |
| 2,118,420 | Spratley | May 24, 1938 |
| 2,737,744 | Sturges et al. | Mar. 13, 1956 |

UNITED STATES PATENT OFFICE

CERTIFICATE OF CORRECTION

Patent No. 2,795,878                                June 18, 1957

John E. T. Welland

It is hereby certified that error appears in the printed specification of the above numbered patent requiring correction and that the said Letters Patent should read as corrected below.

Column 2, lines 20 and 59, for "$30°$ to $10°$", each occurrence, read -- $3°$ to $10°$ --.

Signed and sealed this 10th day of February 1959.

(SEAL)
Attest:

KARL H. AXLINE                                           ROBERT C. WATSON
Attesting Officer                                         Commissioner of Patents